United States Patent [19]
Cullen

[11] Patent Number: 5,396,753
[45] Date of Patent: * Mar. 14, 1995

[54] AGRICULTURAL BAGGING MACHINE

[76] Inventor: Steven R. Cullen, P.O. Box 642, Astoria, Oreg. 97103

[*] Notice: The portion of the term of this patent subsequent to May 24, 2011 has been disclaimed.

[21] Appl. No.: 88,778

[22] Filed: Jul. 8, 1993

Related U.S. Application Data

[63] Continuation of Ser. No. 879,789, May 6, 1992, abandoned, which is a continuation-in-part of Ser. No. 815,942, Dec. 30, 1991, abandoned.

[51] Int. Cl.6 .................. B65B 9/10; B65B 43/42; B65B 43/26
[52] U.S. Cl. ........................ 53/567; 53/570; 53/576; 141/73; 141/114; 100/100
[58] Field of Search ............. 53/523, 524, 530, 567, 53/575, 576, 577, 521, 258, 570; 141/73, 80, 114; 100/65, 100, 139, 144, 146; 198/608, 662, 663

[56] References Cited

U.S. PATENT DOCUMENTS

| | | | |
|---|---|---|---|
| 2,646,913 | 7/1953 | Goldberg et al. | 226/45 |
| 3,065,842 | 11/1962 | Nowak | 198/608 |
| 3,348,475 | 10/1967 | Fenster et al. | 100/146 |
| 3,602,380 | 8/1971 | Spencer | 198/608 |
| 3,687,061 | 8/1972 | Eggenmuller et al. | 100/65 |
| 4,046,068 | 9/1977 | Eggenmuller et al. | 100/65 |
| 4,102,109 | 7/1978 | Modra et al. | 53/24 |
| 4,256,031 | 3/1981 | Ryan | 100/65 |
| 4,337,805 | 7/1982 | Johnson et al. | 141/71 |
| 4,502,378 | 3/1985 | Cullen | 100/65 |
| 4,567,820 | 2/1986 | Munsell | 100/65 |
| 4,653,553 | 3/1987 | Cox et al. | 100/65 X |
| 4,724,876 | 2/1988 | Ryan | 141/114 |
| 4,949,633 | 8/1990 | Johnson et al. | 100/65 |
| 5,113,635 | 5/1992 | Takai et al. | 53/530 |
| 5,313,768 | 5/1994 | Cullen | 53/570 |

Primary Examiner—Linda B. Johnson
Attorney, Agent, or Firm—Zarley, McKee, Thomte, Voorhees & Sease

[57] ABSTRACT

An agricultural bagging machine is disclosed comprising a vertically disposed feeder positioned above the rotor thereof to move silage downwardly into contact with the rotor. A substantially horizontally disposed feeder is positioned forwardly of the rotor to move silage rearwardly into contact with the rotor. Each of the feeders comprises a plurality of spaced-apart augers which are mounted to permit the separation of the same should the operator inadvertently come into contact with the rotating augers.

13 Claims, 3 Drawing Sheets

AGRICULTURAL BAGGING MACHINE

This is a continuation of application Ser. No. 07/879,789, filed on May 6, 1992, now abandoned, which is a CIP of application Ser. No. 07/815,942, filed Dec. 30, 1991, now abandoned.

BACKGROUND OF THE INVENTION

Agricultural bagging machines have been employed for several years to bag or pack silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor which conveys the silage into a tunnel on which the bag is positioned so that the bag is filled. In the prior art devices, the silage tends to bridge or clog in the hopper or intake end of the bagging machine. U.S. Pat. No. 4,337,805 discloses a beater bar feeder arrangement for supplying the silage to the rotor and which is intended to prevent bridging or clogging of the silage in the hopper.

In the beater bar arrangement such as disclosed in U.S. Pat. No. 4,337,805, a dangerous hazard is present due to the projections or arms extending from the rotating beater bar. Further, the rotating beater bar of U.S. Pat. No. 4,337,805 tends to throw silage particles into the air, making for a dusty condition.

Additionally, a beater bar also is inefficient due to the materials going in a circular pattern instead of straight down towards the rotor. The beater bar also does not work well with materials that are long in length (2" or longer) as those materials tend to build up on projections making a solid round ineffective mass that must be manually cleared of debris.

In the co-pending application, an improved agricultural bagging machine is disclosed which includes a vertically disposed chain feeder positioned above the rotor of the machine for conveying silage to the rotor. While the bagging machine of the co-pending application represents a significant advance in the art, the instant invention is believed to represent an improvement over the invention of the co-pending application.

It is therefore a principal object of the invention to provide an improved agricultural bagging machine.

Yet another object of the invention is to provide an agricultural bagging machine having a first feeder positioned above the rotor of the machine for conveying silage to the rotor with the first feeder comprising a plurality of horizontally spaced and vertically disposed augers.

Yet another object of the invention is to provide an improved agricultural bagging machine having a vertically disposed auger feeder system positioned above the rotor which provides a more efficient delivery of silage to the rotor.

Yet another object of the invention is to provide an agricultural bagging machine having a plurality of vertically disposed rotatable augers positioned above the rotor with the lower ends of the augers being freely mounted so that the augers may move rearwardly, forwardly, or side-to-side in the event that the operator accidently comes into contact with the augers, thereby preventing injury to the operator.

Still another object of the invention is to provide an agricultural bagging machine which eliminates the dusty conditions normally associated with beater bar feeders in prior art agricultural bagging machines.

Still another object of the invention is to provide an agricultural bagging machine which has a plurality of rotatable augers disposed in a horizontal condition forwardly of the rotor.

Yet another object of the invention is to provide an agricultural bagging machine which is economical of manufacture, durable in use and refined in appearance.

These and other objects of the invention will be apparent in those skilled in the art.

SUMMARY OF THE INVENTION

An improved agricultural bagging machine is disclosed wherein a vertically disposed first feeder is positioned above the rotor of the machine to move silage downwardly into contact with the rotor in a more efficient and safer manner than in the prior art devices. A second feeder is positioned forwardly of the rotor for conveying silage rearwardly toward the rotor. The first feeder is comprised of a plurality of substantially vertically disposed and horizontally spaced augers with the upper ends being rotatably supported on the machine and driven by a motor or the like. The vertically disposed feeders are arranged in a plurality of pairs of augers with each of the augers in each pair being rotated in an opposite direction with respect to one another. The flighting on each of the augers in each pair is oppositely disposed. The lower ends of the vertically disposed augers are free-floating so that the augers may move rearwardly, forwardly, or side-to-side to permit the separation thereof should the operator inadvertently come into contact with the augers. The second feeder comprises a plurality of horizontally disposed and horizontally spaced augers which are arranged in pairs with each auger of each pair being rotated in opposite directions with respect to one another. The flighting on the augers of each pair is also oppositely disposed. In operation, the vertically disposed conveyors convey the silage in the hopper of the machine downwardly into contact with the rotor. In operation, the horizontally disposed augers convey the silage in the hopper rearwardly towards the rotor.

DESCRIPTION OF THE PREFERRED EMBODIMENT

Figure 2:
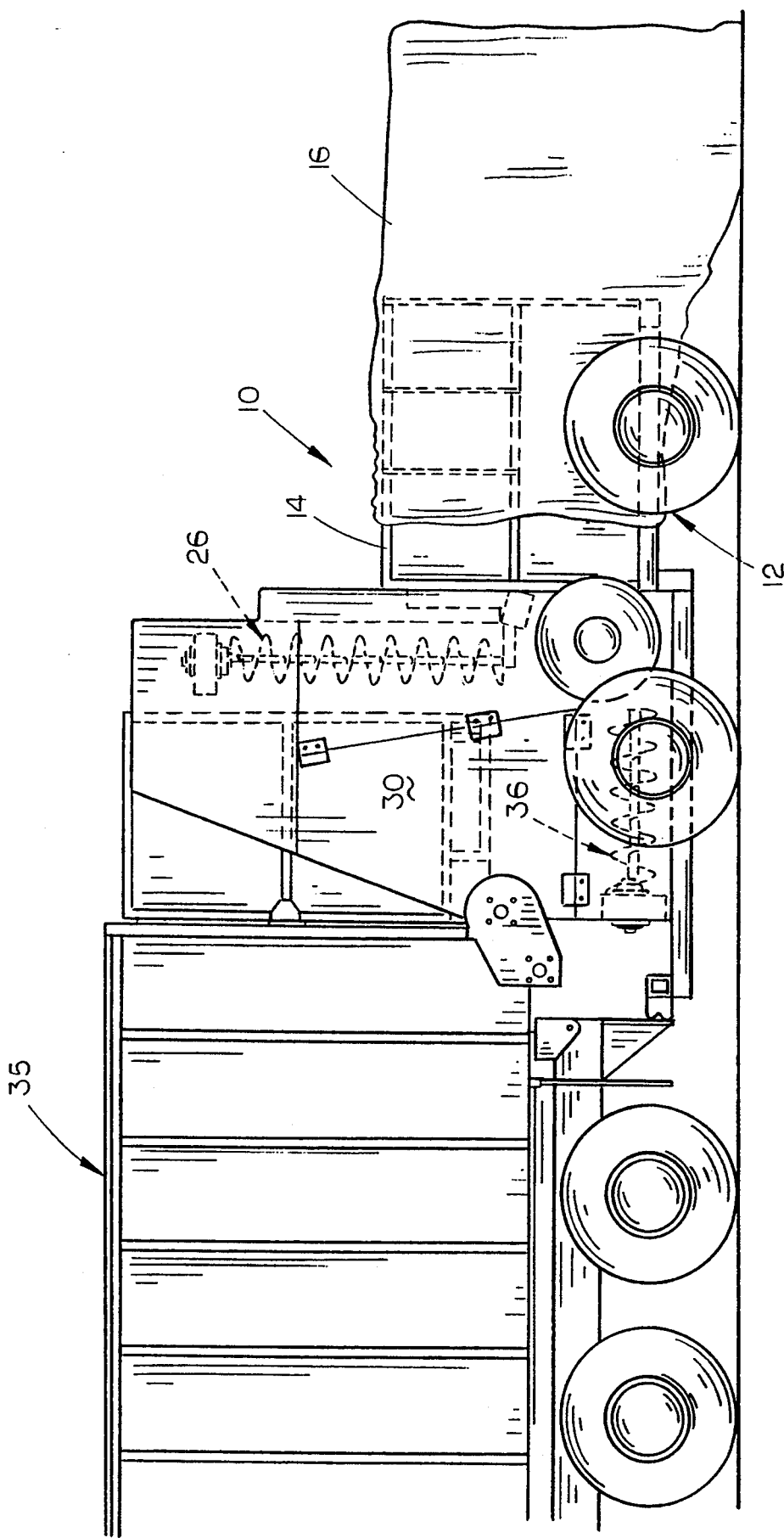
FIG. 2 is a side elevational view of the bagging machine of this invention illustrating its relationship with the truck or the like which is being used to dump silage into the machine.

The agricultural bagging machine of this invention is referred to generally by the reference numeral 10. Machine 10 includes a wheeled frame means 12 having a tunnel 14 mounted thereon upon which is normally positioned the open mouth of an agricultural bag 16 as illustrated in FIG. 2. For purposes of conciseness, the power means for driving the various components of the machine has not been disclosed since the same does not form a part of the invention. Also for the purposes of conciseness, the braking system of the machine has not been illustrated since the same does not form a part of the invention.

Figure 3:
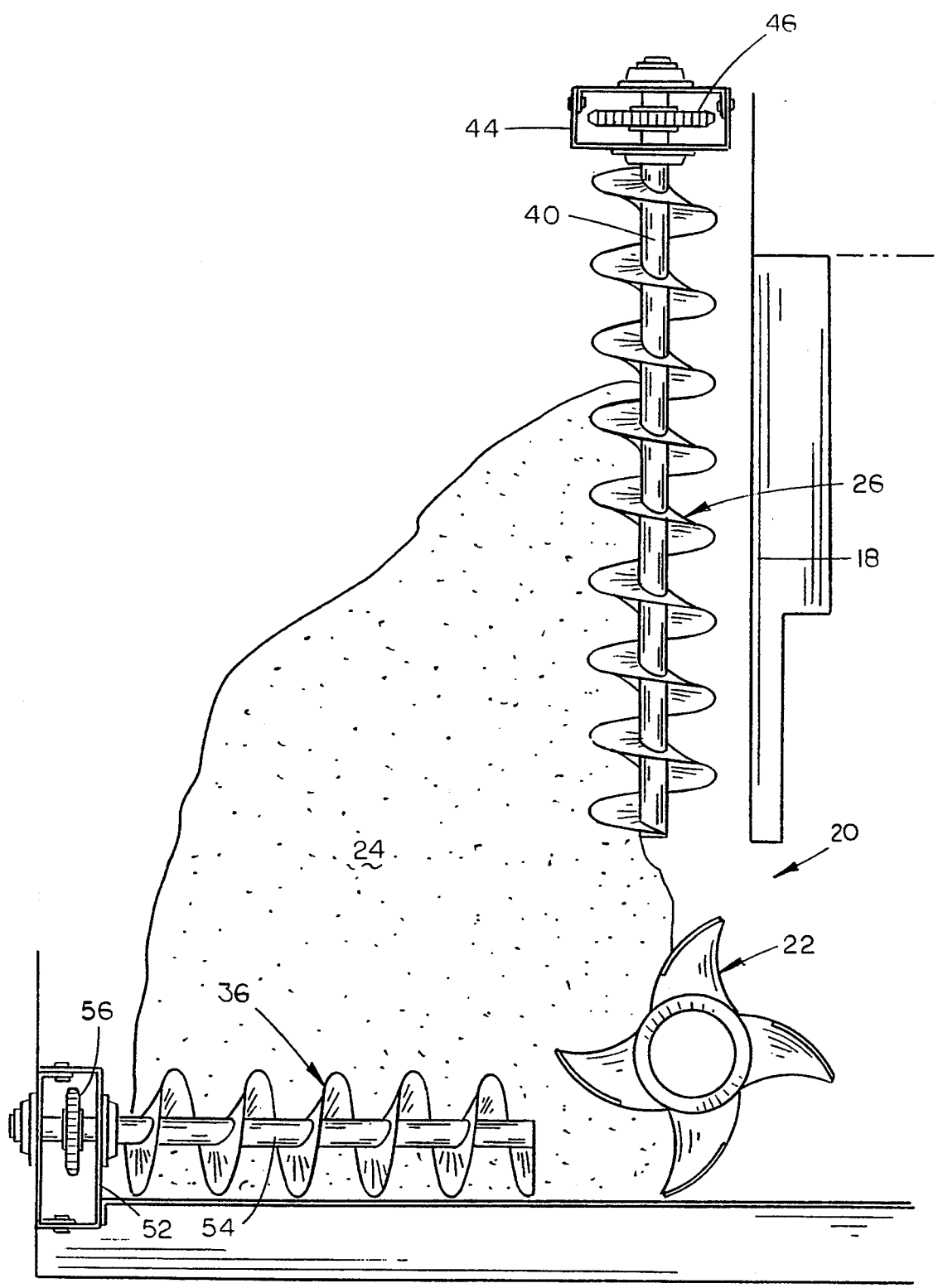
FIG. 3 is a partial side view illustrating one of the vertically disposed augers, one of the horizontal augers, and the rotor of the machine.

Machine 10 includes a face plate 18 at the forward end of the tunnel 14 which defines an opening or passageway 20 at the inlet of the tunnel 14. A conventional rotor 22 is rotatably mounted in the passageway 20 and is rotated in a counterclockwise fashion as viewed in FIG. 3 to force silage 24 or the like through the tunnel 14 and into the bag 16 in conventional fashion.

The invention disclosed herein departs from the conventional bagging machines in that a novel vertically disposed first feeder 26 is provided at the rearward end of the hopper or feed table 28. Hopper or feed table 28 is defined by opposite sides 30 and 32 and a table nose 34 at the lower forward end thereof which is adapted to push the unloading truck 35. Unloading truck 35 preferably has a "live" floor therein so that the silage or the like within the truck 35 may be conveyed rearwardly into the hopper 28. A substantially horizontally disposed second feeder 36 is mounted in the hopper 28 as illustrated in the drawings.

Figure 1:
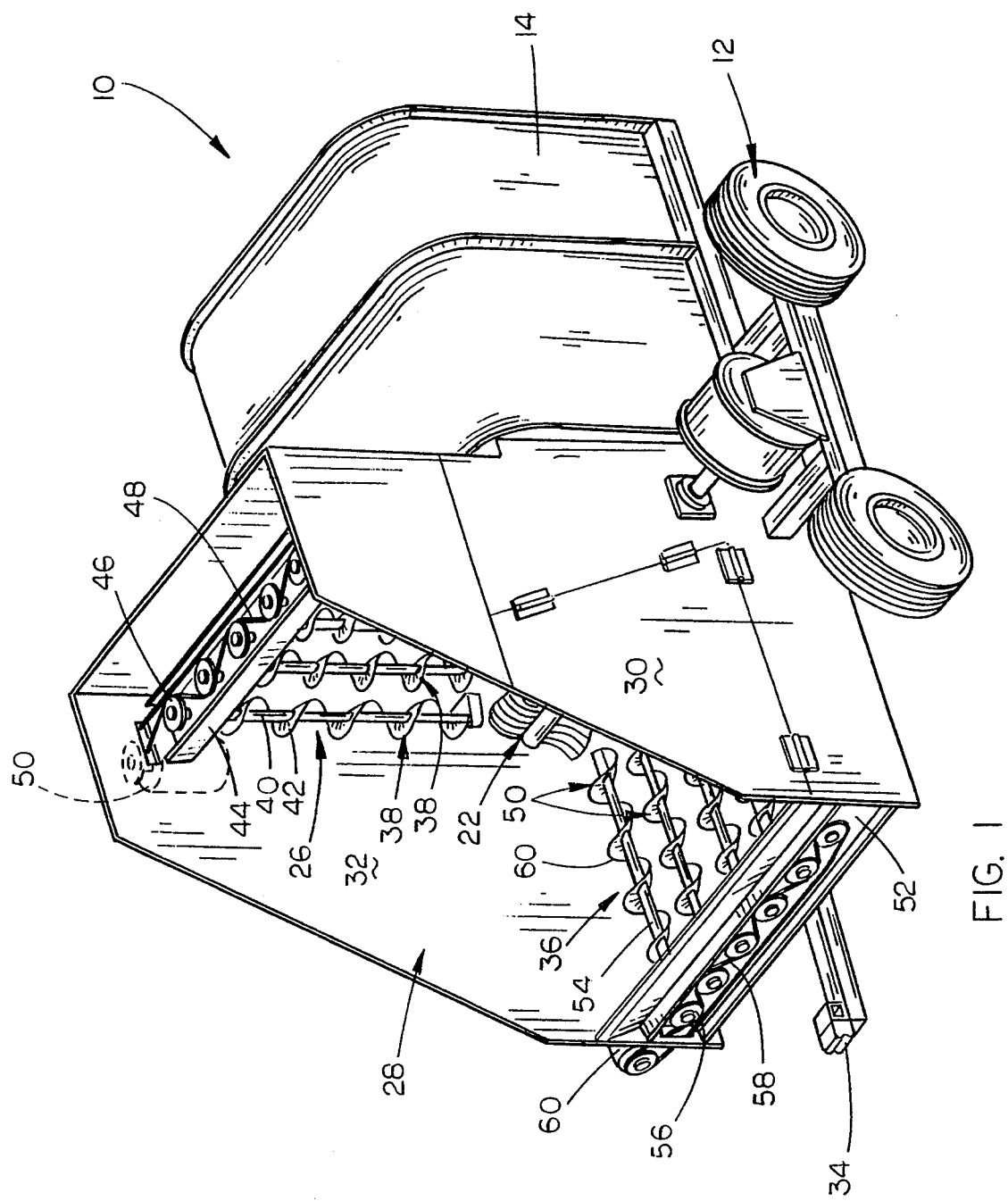
FIG. 1 is a front perspective view of the bagging machine of this invention.

Feeder 26 comprises a plurality of substantially vertically disposed and horizontally spaced augers 38. Each of the augers 38 comprises a shaft 40 having auger flighting 42 thereon. The upper ends of each of the augers 38 are rotatably mounted in support 44 which is secured to and which extends between the walls 30 and 32 of hopper 28 at the upper end thereof. As seen in FIG. 1, the upper ends of each of the shafts 40 of the augers have sprockets 46 mounted thereon which are driven by a chain 48 operatively connected to a suitable power source 50. The augers 38 are arranged in a plurality of pairs with the augers in each pair being rotated in opposite directions. Further, the flighting of each auger of each pair is oppositely disposed. The lower ends of the augers 38 are free-floating so that the augers may freely move rearwardly, forwardly or side-to-side in the event that the operator should inadvertently come into contact with the rotors. For example, if an operator should reach into a pair of the augers, the augers will not pull the operator into the machine but the augers will simply move away from one another due to the free-floating mounting of the same.

Similarly, feeder 36 is comprised of a plurality of substantially horizontally disposed augers 50 which have their forward ends rotatably mounted in a support 52. The shafts 54 of each of the augers 50 have a sprocket 56 mounted thereon which is in contact with chain 58 driven by a suitable power source 60. The augers 50 are arranged in a plurality of pairs with each of the augers in each pair being rotated in opposite directions. The flighting 60 on each auger of each pair is oppositely disposed. The rearward ends of the augers 50 are also free-floating so that the rearward ends of the augers may freely move should the operator inadvertently come into contact with the augers. In the event of such contact, the augers will not pull the operator into the machine.

It has been found that the vertically disposed augers and the horizontally disposed augers very efficiently convey the silage in the hopper 28 to the rotor 22 without the inherent dust problems and safety hazards normally associated with the beater bar systems of certain of the prior art devices.

Thus it can be seen that the invention accomplishes at least all of its stated objectives.

I claim:

1. An agricultural bagging machine for bagging material into agricultural bags comprising,
   a wheeled frame means having rearward and forward ends,
   a tunnel means on said wheeled frame means and having a forward intake end for receiving silage and a rearward output end adapted to receive the mouth of an agricultural bag,
   a horizontally disposed rotor means at the forward intake end of said tunnel means for forcing silage rearwardly into said tunnel means and into said bag,
   a hopper means on said wheeled frame means for receiving silage,
   said rotor means being in communication with said hopper means,
   a first, substantially vertically disposed powered feeder means positioned in said hopper means, said first feeder means being positioned above said rotor means for moving silage downwardly in said hopper means towards said rotor means, said first feeder means having upper and lower ends, the lower end of said first feeder means being disposed above said rotor means,
   and a second powered feeder means positioned in said hopper means adjacent said intake end and forwardly of said rotor means for moving silage rearwardly in said hopper means towards said rotor means, said second feeder means having rearward and forward ends, the rearward end of said second feeder means being disposed forwardly of said rotor means,
   said second powered feeder means being positioned below the lower end of said first powered feeder means;
   said first and second powered feeder means being angularly positioned with respect to each other to cooperate and feed the material therebetween to said rotor means.

2. The machine of claim 1 wherein said second feeder means is substantially horizontally disposed.

3. The machine of claim 1 wherein said first feeder means comprises a plurality of vertically disposed and horizontally spaced rotatable augers.

4. The machine of claim 3 wherein each of said augers is rotatably mounted and driven at its upper end.

5. The machine of claim 4 wherein the lower end of each of said augers is not fixed in position but is free to move either forwardly, rearwardly, or side-to-side.

6. The machine of claim 1 wherein said first feeder means comprises a plurality of pairs of augers, said augers being substantially vertically disposed and horizontally spaced, the augers in each pair of augers being rotated in opposite directions, the flighting on the augers in each pair of augers being oppositely disposed.

7. The machine of claim 3 wherein said second feeder means comprises a plurality of substantially horizontally disposed and horizontally spaced augers having rearward and forward ends.

8. The machine of claim 7 wherein the rearward end of each of said augers of said second feeder means is disposed adjacent said rotor means.

9. The machine of claim 8 wherein the rearward ends of said augers of said second feeder means are positioned below the rotational axis of said rotor means.

10. The machine of claim 3 wherein said second feeder means comprises a plurality of pairs of augers, said augers of said second feeder means being substantially horizontally disposed and horizontally spaced.

11. The machine of claim 10 wherein the augers of each pair of augers are rotated in opposite directions.

12. The machine of claim 11 wherein the flighting of the augers in each pair of augers is oppositely disposed.

13. The machine of claim 7 wherein the rearward ends of said augers of said second feeder are free-floating.

* * * * *